(12) United States Patent
Mashimo et al.

(10) Patent No.: US 6,778,478 B2
(45) Date of Patent: Aug. 17, 2004

(54) OPTICAL DISK RECORDING APPARATUS AND METHOD OF RECORDING DATA ON OPTICAL DISK

(75) Inventors: Akira Mashimo, Tokorozawa (JP); Naoto Takeda, Tokyo (JP); Kaname Hayasaka, Hanno (JP)

(73) Assignee: TEAC Corporation, Tokyo (JP)

( * ) Notice: Subject to any disclaimer, the term of this patent is extended or adjusted under 35 U.S.C. 154(b) by 601 days.

(21) Appl. No.: 09/827,403

(22) Filed: Apr. 5, 2001

(65) Prior Publication Data

US 2001/0028617 A1 Oct. 11, 2001

(30) Foreign Application Priority Data

Apr. 7, 2000 (JP) .................................... 2000-107052
Mar. 27, 2001 (JP) .................................... 2001-091193

(51) Int. Cl.[7] ............................................. G11B 7/00
(52) U.S. Cl. ............................. 369/47.53; 369/59.11
(58) Field of Search .......................... 369/13.04, 13.25, 369/13.26, 13.27, 47.5, 47.53, 59.11, 116, 275.2

(56) References Cited

FOREIGN PATENT DOCUMENTS

| JP | 10-064064 | 3/1998 |
| KR | 00267982 | 10/2000 |

*Primary Examiner*—Thang V. Tran
*Assistant Examiner*—Bach Vuong
(74) *Attorney, Agent, or Firm*—Anderson Kill & Olick; Eugene Lieberstein; Michael N. Meller

(57) ABSTRACT

A recording apparatus for an erasable optical disk, which includes: a first part which measures a modulation degree of a signal reproduced from an area of the optical disk at a time of overwriting first data recorded in the area with second data; a second part which determines a first write power level corresponding to the modulation degree measured by said first part based on a relation between write power levels and modulation degrees of signals reproduced from a test recording area of the optical disk, the signals being recorded therein with the corresponding write power levels different from one another; a third part which obtains a target modulation degree corresponding to a type of and a recording rate for the optical disk from one of tables prestoring modulation degrees corresponding to optical disk types and recording rates; and a fourth part which obtains a write power level for overwriting from the first write power level based on a comparison between the target modulation degree and the modulation degree measured by said first part, wherein the recording apparatus overwrites the first data with the second data with the write power level for overwriting.

24 Claims, 14 Drawing Sheets

OPTICAL DISK RECORDING APPARATUS AND METHOD OF RECORDING DATA ON OPTICAL DISK

BACKGROUND OF THE INVENTION

1. Field of the Invention

The present invention generally relates to optical disk recording apparatuses and methods of recording data on optical disks, and more particularly to an optical disk recording apparatus that records data on an erasable optical disk and a method of recording data on an erasable optical disk.

2. Description of the Related Art

Direct-read-after-write optical disks are of two general types: write-once and erasable. In overwriting an erasable optical disk, a laser beam having a laser power alternating between a write power Pw and an erase power Pe is employed. In this case, the write power Pw forms pits on the recording film of the optical disk by changing the state of the recording film from a crystalline state to an amorphous state, and the erase power Pe erases the pits by changing the state of the recording film from the amorphous state to the crystalline state.

The Optimum levels of the write and erase powers Pw and Pe (optimum write and erase powers Pwo and Peo) of the laser beam at a time of recording data on an optical disk differ depending on a type of the optical disk, a recording apparatus, and a recording rate. Therefore, in order to set the optimum write and erase powers Pwo and Peo based on the combination of a type of the optical disk, a recording apparatus, and a recording rate employed in a practical recording, a recording power calibration called OPC (Optimum Power Control) is performed prior to the recording of data.

A description will be given of an OPC operation in a conventional optical disk recording apparatus for an erasable optical disk.

FIG. 1 is a diagram for illustrating the test recording area of the optical disk.

As shown in FIG. 1, a data area for storing a variety of data and a PCA (Power Calibration Area) that is a test recording area for setting the optimum write power of a laser beam are formed on the recording surface of the optical disk. The PCA, which is formed along a track closest to a disk center, includes a test area and a count area. The test area is formed of 100 partitions, and each partition is formed of 15 frames. In one OPC operation, one partition is used so that each frame of the partition is recorded with a test signal with a different level of the laser power. That is, the laser power has the 15 levels. Each test signal is an EFM-modulated signal formed of a pulse train having a pulse width three to ten times a reference pulse width T, and is recorded on each frame with pits of nine types of lengths. The reference pulse width T is for one cycle of a pulse signal having a frequency of 4.32 MHz, and is 230 nsec at a normal rate (1×).

The laser beam is emitted onto each frame so that each test signal is reproduced by detecting a light reflected back therefrom. At the same time, a modulation degree m as an index indicating the magnitude of the amplitude of each reproduced HF (high frequency) signal is measured by using the following equation $$m = I11/Itop \quad (1)$$

where I11 is an amplitude of a reproduced HF signal based on pits and lands (regions between pits) of a pulse width 11 times the reference pulse width T, and Itop is the optical reflectivity of the lands as shown in FIG. 2. In FIG. 2, I3 is an amplitude of the reproduced HF signal based on pits and lands of a pulse width three times the reference pulse width T. The modulation degree m differs depending on the level of the write power Pw.

As shown in FIG. 3, as the level of the write power Pw becomes lowers, the modulation degree m becomes smaller because the amplitude of the reproduced HF signal becomes smaller. On the other hand, as the level of the write power Pw becomes higher, the modulation degree m becomes larger because the amplitude of the reproduced HF signal becomes larger. If the write power Pw is increased to a certain level, the modulation degree m becomes saturated. The write power Pw of the level at which the modulation degree m starts to be saturated minimizes a jitter or error in recording data. Therefore, the write power Pw of that level is determined to be the optimum write power Pwo.

In the case of determining the optimum write power Pwo by the modulation degree m, a method using a parameter γ obtained from the characteristic of the modulation degree m is employed. The parameter γ is given by the following equation $$\gamma = (dm/dPw) \times (Pw/m) \quad (2)$$

That is, the parameter γ is the differential of the characteristic of the modulation degree m. The optical disk is prerecorded with the target value γ target of the parameter γ as ATIF (Absolute Time In Pregroove) information. Therefore, as show in FIG. 4, the characteristic of the parameter γ is obtained from the characteristic of the modulation degree m according to the above-described equation (2), and then a write power level Ptarget that realizes the target value γ target is obtained. Since the optical disk is prerecorded with a coefficient ρ for obtaining the optimum write power Pwo from the write power level Ptarget as the ATIP information, the optimum write power Pwo is obtained, by using the coefficient ρ, from the following equation $$Pwo = \rho \times Ptarget \quad (3)$$

The optimum write power Pwo obtained from the above-described equation (3) is set and used as a write power at the time of a signal recording. The optimum erase power Peo is set, by using the optimum write power Pwo, and coefficients ε and κ recorded on the optical disk as the ATIP information, based on the following equations $$Peo = \varepsilon \times Pwo \quad (4)$$

$$Peo = \theta \times \varepsilon \times Pwo \quad (5)$$

Here, the coefficient ε is a Pe/Pw ratio, and the coefficient κ is a Pe/Pw ratio compensation coefficient for a low-speed recording.

The optimum write and erase powers Pwo and Peo of the laser beam provided by the OPC operation in the unrecorded test recording area are also employed in overwriting data onto a recording area of the erasable optical disk which area is already recorded with a signal so that pits are formed in the recording area. However, the signal recorded on the recording area by the write power Pw of a high level cannot be erased completely unless being erased by the erase power Pe of a level as high as a certain level.

However, if the write and erase powers Pw and Pe for overwriting are set to higher levels to improve recording characteristics such as a jitter and a block error rate at a time of overwriting (overwriting recording characteristics), deeper pits are formed so that the durability of the optical disk is impaired.

SUMMARY OF THE INVENTION

It is a general object of the present invention to provide an optical disk recording apparatus and a method of recording data on an optical disk in which the above-described disadvantages are eliminated.

A more specific object of the present invention is to provide an optical disk recording apparatus and a method of recording data on an optical disk which apparatus and method improve recording characteristics at the time of an overwriting and the durability of an optical disk.

The above-objects of the present invention are achieved by a recording apparatus for an erasable optical disk, which apparatus includes: a first part which measures a modulation degree of a signal reproduced from an area of the optical disk at a time of overwriting first data recorded in the area with second data; a second part which determines a first write power level corresponding to the modulation degree measured by the first part based on a relation between write power levels and modulation degrees of signals reproduced from a test recording area of the optical disk, the signals being recorded therein with the corresponding write power levels different from one another; a third part which obtains a target modulation degree corresponding to a type of and a recording rate for the optical disk from one of tables prestoring modulation degrees corresponding to optical disk types and recording rates; and a fourth part which obtains a write power level for overwriting from the first write power level based on a comparison between the target modulation degree and the modulation degree measured by the first part, wherein the recording apparatus overwrites the first data with the second data with the write power level for overwriting.

The above-objects of the present invention are also achieved by a recording apparatus for an erasable optical disk, which apparatus includes: a first part which measures a modulation degree of a signal reproduced from an area of the optical disk at a time of overwriting first data recorded in the area with second data; a second part which determines a first write power level corresponding to the modulation degree measured by the first part based on a first relation between write power levels and modulation degrees of signals reproduced from a test recording area of the optical disk, the signals being recorded therein with the corresponding write power levels different from one another; a third part which obtains, based on the first relation, a second relation between the write power levels and modulation parameters obtained from the modulation degrees; a fourth part which obtains, based on the first and second relations, a target modulation degree corresponding to a target modulation degree parameter read from the optical disk; and a fifth part which obtains a write power level for overwriting from the first write power level based on a comparison between the target modulation degree and the modulation degree measured by the first part, wherein the recording apparatus overwrites the first data with the second data with the write power level for overwriting.

The above-objects of the present invention are also achieved by a recording apparatus for an erasable optical disk, which apparatus includes: a first part which measures a modulation degree of a signal reproduced from an area of the optical disk at a time of overwriting first data recorded in the area with second data; a second part which determines a first write power level corresponding to the modulation degree measured by the first part based on a relation between write power levels and modulation degrees of signals reproduced from a test recording area of the optical disk, the signals being recorded therein with the corresponding write power levels different from one another; a third part which obtains a target modulation degree from the relation between the write power levels and the modulation degrees; and a fourth part which obtains a write power level for overwriting from the first write power level based on a comparison between the target modulation degree and the modulation degree measured by the first part, wherein the recording apparatus overwrites the first data with the second data with the write power level for overwriting.

The above-objects of the present invention are also achieved by a method of recording data on an erasable optical disk, which method includes the steps of (a) measuring a modulation degree of a signal reproduced from an area of the optical disk at a time of overwriting first data recorded in the area with second data; (b) determining a first write power level corresponding to the modulation degree measured by the step (a) based on a relation between write power levels and modulation degrees of signals reproduced from a test recording area of the optical disk, the signals being recorded therein with the corresponding write power levels different from one another, (c) obtaining a target modulation degree corresponding to a type of and a recording rate for the optical disk from one of tables prestoring modulation degrees corresponding to optical disk types and recording rates, (d) obtaining a write power level for overwriting from the first write power level based on a comparison between the target modulation degree and the modulation degree measured by the step (a), and (e) overwriting the first data with the second data with the write power level for overwriting.

The above-objects of the present invention are also achieved by a method of recording data on an erasable optical disk, which method includes the steps of, (a) measuring a modulation degree of a signal reproduced from an area of the optical disk at a time of overwriting first data recorded in the area with second data, (b) determining a first write power level corresponding to the modulation degree measured by the step (a) based on a first relation between write power levels and modulation degrees of signals reproduced from a test recording area of the optical disk, the signals being recorded therein with the corresponding write power levels different from one another, (c) obtaining, based on the first relation, a second relation between the write power levels and modulation parameters obtained from the modulation degrees, (d) obtaining, based on the first and second relations, a target modulation degree corresponding to a target modulation degree parameter read from the optical disk, (e) obtaining a write power level for overwriting from the first write power level based on a comparison between the target modulation degree and the modulation degree measured by the step (a), and (f) overwriting the first data with the second data with the write power level for overwriting.

The above-objects of the present invention are further achieved by a method of recording data on an erasable optical disk, which method includes the steps of (a) measuring a modulation degree of a signal reproduced from an area of the optical disk at a time of overwriting first data recorded in the area with second data, (b) determining a first write power level corresponding to the modulation degree measured by the step (a) based on a relation between write power levels and modulation degrees of signals reproduced from a test recording area of the optical disk, the signals being recorded therein with the corresponding write power levels different from one another, (c) obtaining a target modulation degree from the relation between the write power levels and the modulation degrees, (d) obtaining a write power level for overwriting from the first write power level based on a comparison between the target modulation degree and the modulation degree measured by the step (a), and (e) overwriting the first data with the second data with the write power level for overwriting.

The above-described apparatuses and methods take into consideration the fact that the overwriting recording characteristics depend greatly on the states, or depths, of pits already formed on the optical disk, that is, the modulation degree. Therefore, according to the above-described apparatuses and methods, the overwriting recording characteristics as well as the durability of the optical disk are improved.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description will now be given, with reference to the accompanying drawings, of an embodiment of the present invention.

Figure 5:
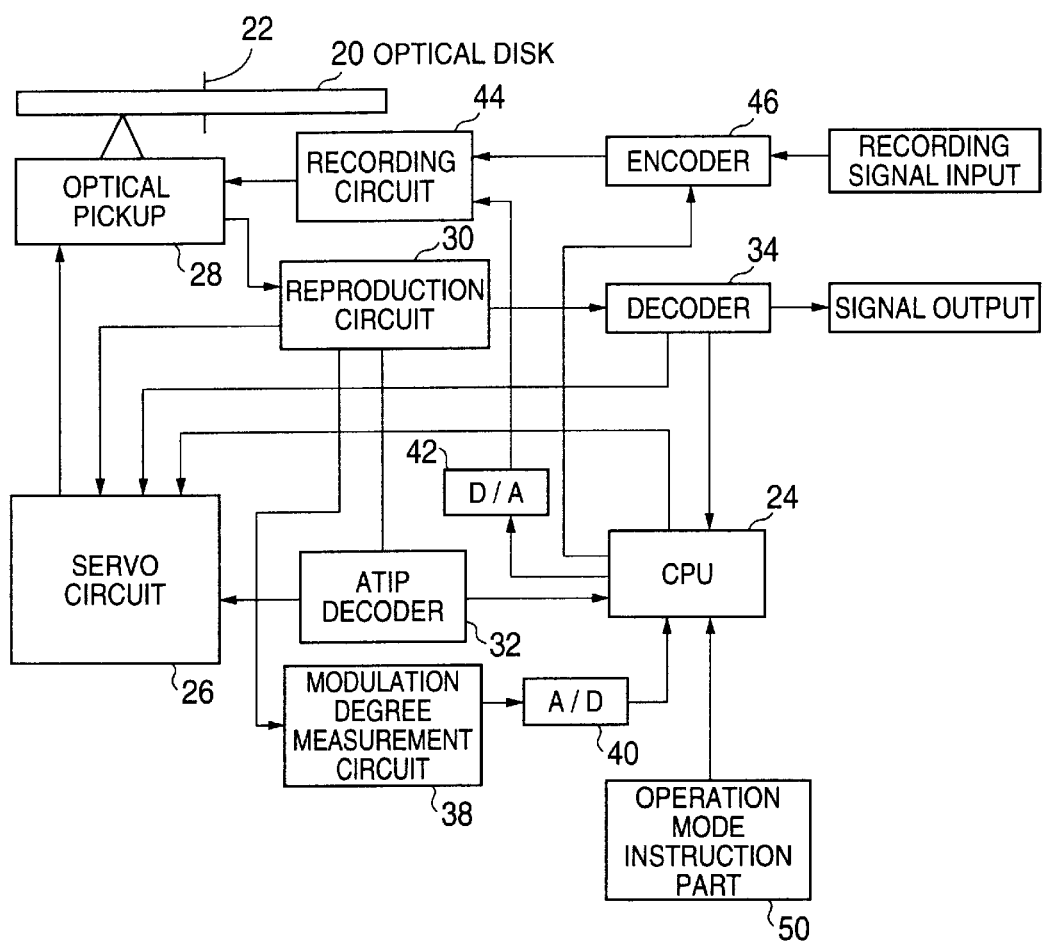
FIG. 5 is a block diagram of an optical disk recording apparatus according to an embodiment of the present invention.

FIG. 5 is a block diagram of an optical disk recording apparatus according to the embodiment of the present invention. In the drawing, an optical disk 20 is driven by a spindle motor (not shown) to rotate on a shaft 22. A CPU 24 supplies a command to a servo circuit 26 based on a write or read command supplied from a host computer (not shown).

The servo circuit 26 performs the CLV (Constant Linear Velocity) servo of the above-mentioned spindle motor. The servo circuit 26 further controls the rotation of the thread motor (not shown) of an optical pickup 28 so as to move the optical pickup 28 to a desired block, and performs the focus servo and tracking servo of the optical pickup 28.

A laser beam emitted from the optical pickup 28 is reflected back from the recording surface of the optical disk 20 to be detected by the optical pickup 28. A reproduced HF signal obtained by the optical pickup 28 is supplied to and amplified in a reproduction circuit 30. The amplified reproduced HF signal is supplied to the servo circuit 26 while an ATIP signal separated from the amplified reproduced HF signal EFM-demodulated in the reproduction circuit 30 is supplied to an ATIP decoder 32. Further, the demodulated signal with which synchronization is established is supplied to a decoder 34 to be output therefrom as reproduced data after being subjected to CIRC (Cross-Interleave Reed-Solomon Code) decoding and error correction. The ATIP decoder 32 decodes ATIP information including an ID number and a variety of parameters and supplies the decoded ATIP information to the CPU 24 and the servo circuit 26.

The reproduction circuit 30 also supplies the reproduced HF signal to a modulation degree measurement circuit 38 that measures a modulation degree m of the reproduced HF signal. The modulation degree m is digitized in an analog-to-digital (A/D) converter 40 and is supplied therefrom to the CPU 24.

The CPU 24 generates a write power control signal based on the modulation degree m. The write power control signal is converted into an analog signal in a digital-to-analog (D/A) converter 42 to be supplied to a recording circuit 44 as a write power control voltage. An encoder 46 CIRC-encodes an input signal to be recorded based on the control of the CPU 24 and supplies the encoded signal to the recording circuit 44.

The recording circuit 44 EFM-modulates the signal supplied from the encoder 46 at the time of a recording, and controls the encoded signal so that the encoded signal has a write power corresponding to the write power control voltage. Then, the encoded signal is supplied to the optical pickup 28 to drive a laser diode (LD) thereof so that the laser beam is emitted onto the optical disk 20 for a signal recording.

A memory (RAM) housed in the CPU 24 stores the history of past OPC operations, that is, optimum write powers measured in the past. The history of the past OPC operations is stored for a certain period of time.

Further, a memory (ROM) housed in the CPU 24 stores the tables of target modulation degrees mwo corresponding to optical disk types (ID numbers) and recording rates of 1×, 2×, 4×, and 10× as well as tables each storing OPC operation start and step powers corresponding to the optical disk types and recording rates, and the parameters γ corresponding to the respective optical disk types. An operation mode instruction part 50 supplies an instruction to the CPU 24.

Figure 6:
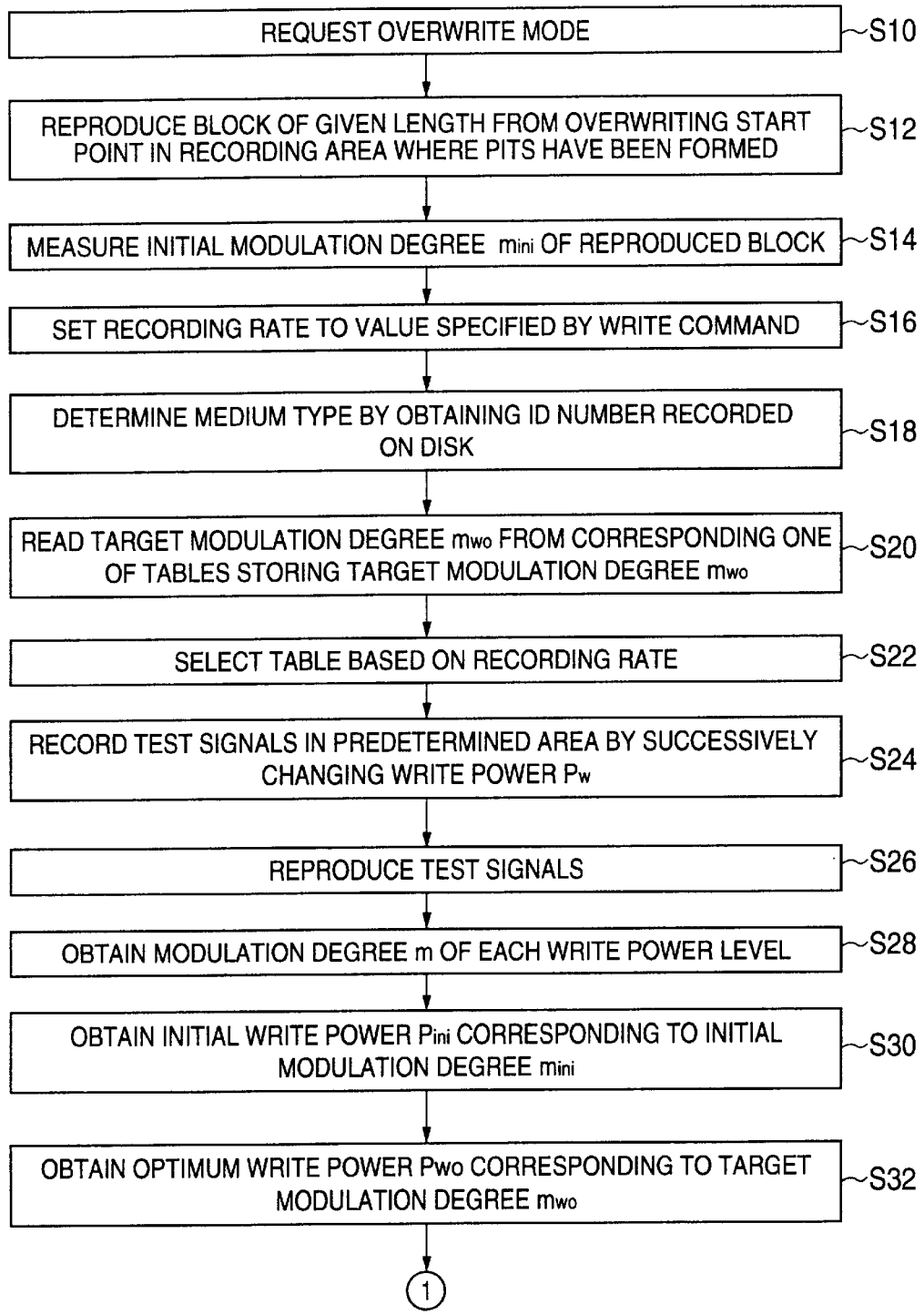
FIGS. 6 and 7 are flowcharts of a first embodiment of an OPC operation performed by a CPU of the optical disk recording apparatus of FIG. 5 at a time of an overwriting.
Figure 7:
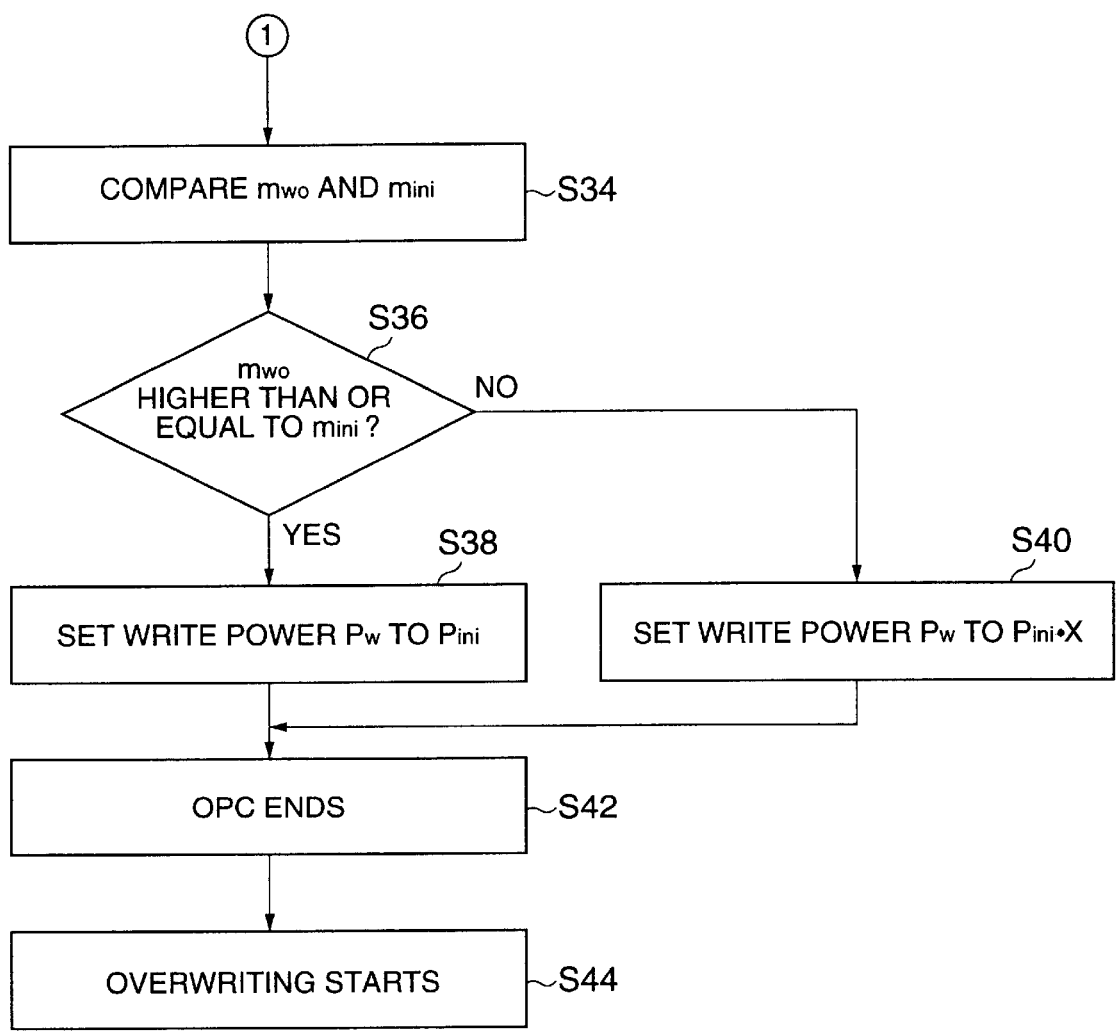

FIGS. 6 and 7 are flowcharts of a first embodiment of an OPC operation performed by the CPU 24 at the time of an overwriting. This embodiment is an OPC operation of a case where a target modulation degree mwo corresponding to the ID number of a loaded optical disk is stored in the ROM of the CPU 24.

In step S10 of FIG. 6, the operation mode instruction part 50 requests an overwrite mode, and in step S12, the CPU 24 reproduces a block of a given length from an overwriting start point in the recording area of the optical disk 20 in which area pits have been formed. Then, in step S14, the CPU 24 measures an initial modulation degree mini of the reproduced block.

Next, in step S16, a recording rate is set to a value specified by a write command, and in step S18, an optical disk type (a medium type) is determined by obtaining an ID number recorded on the optical disk 20 as the ATIP information. Next, in step S20, the target modulation degree mwo of the optical disk 20 is read by referring to a corresponding one of the tables of the target modulation degrees mwo stored in the ROM of the CPU 24 based on the optical disk type and the recording rate. Then, in step S22, a corresponding one of the tables stored in the ROM is selected based on the recording rate, and in step S24, a write power Pw is successively changed from the start power by the amount of the step power to have 15 different levels so that test signals are recorded in the test recording area of the optical disk 20.

Figure 1:
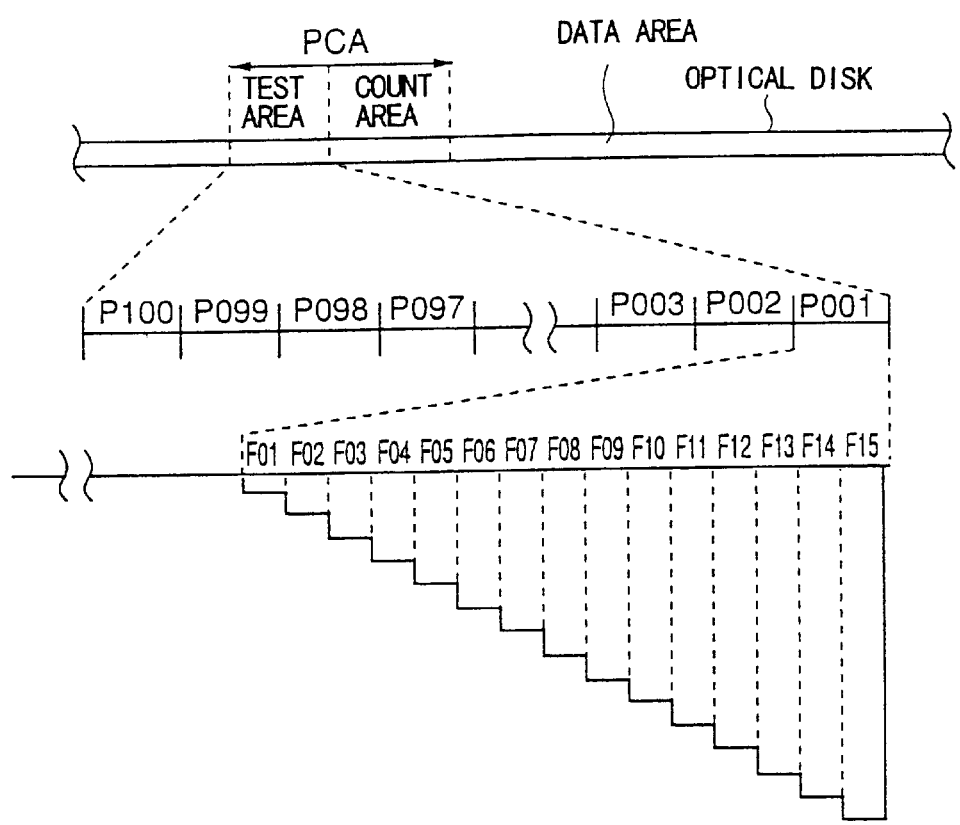
FIG. 1 is a diagram for illustrating a test recording area of an optical disk.
Figure 2:
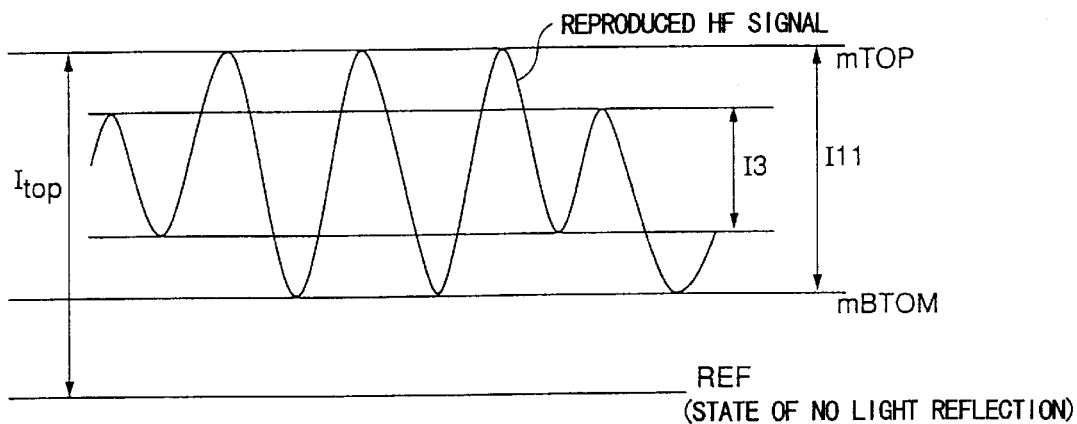
FIG. 2 is a diagram for illustrating a modulation degree.
Figure 3:
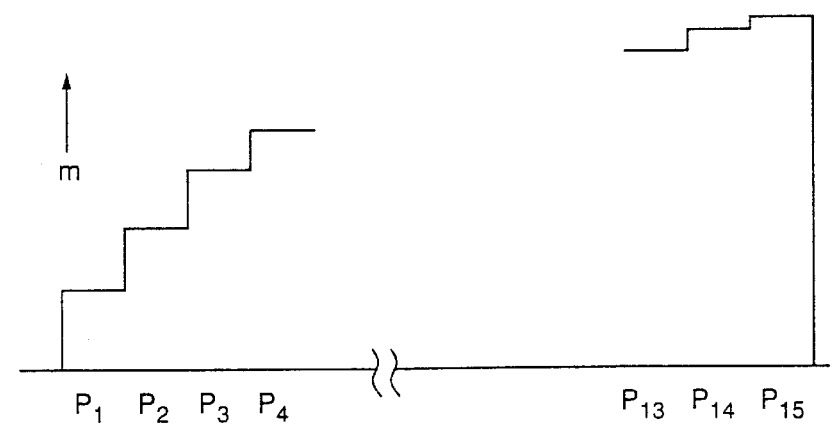
FIG. 3 is a diagram for illustrating a relation between a write power of a laser beam and the modulation degree in an OPC operation.
Figure 4:
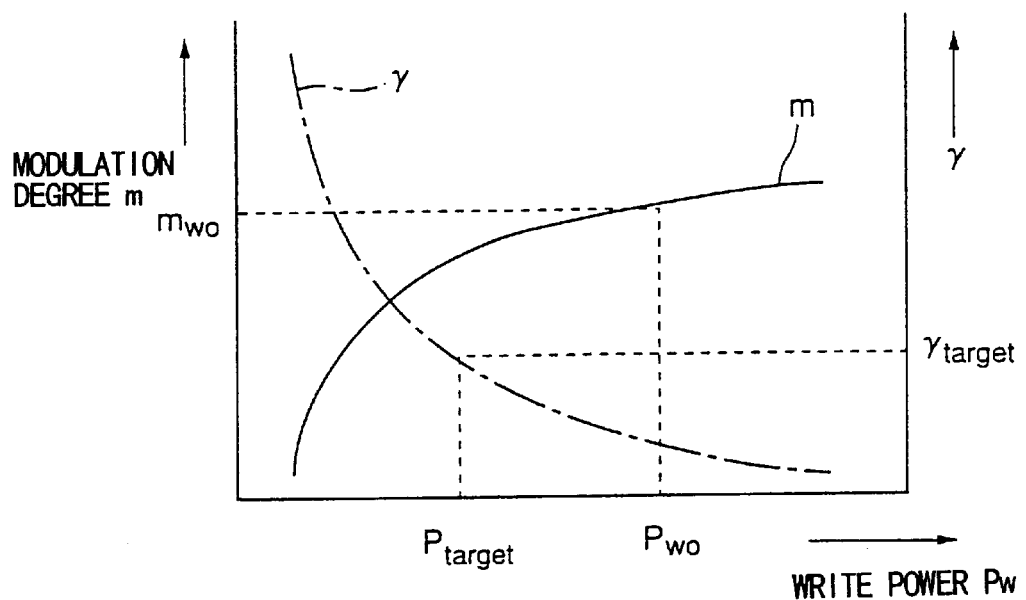
FIG. 4 is a diagram for illustrating a relation between the write power and the modulation degree, and a relation between the write power and a parameter γ in a test recording.

Next, in step S26, the test signals are reproduced, and in step S28, the modulation degree m is measured with respect to each of the 15 levels of the write power Pw so that the characteristic of the modulation degree m indicated by the solid line in FIG. 4 is obtained. The characteristic of the modulation degree m is a relation between the modulation degree m and the writing power Pw of the 15 levels. Thereafter, in step S30, a level of the write power Pw corresponding to the initial target modulation degree mini obtained in step S14 (an initial write power Pini) is obtained from the characteristic of the modulation degree m shown in FIG. 4. Then, in step S32, an optimum write power Pwo corresponding to the target modulation degree mwo is obtained from the characteristic of the modulation degree m shown in FIG. 4.

Next, in step S34 of FIG. 7, a comparison is made between the target modulation degree mwo and the initial target modulation degree mini, so that, in step S36, it is determined whether the target modulation degree mwo is higher than or equal to the initial target modulation degree mini. If it is determined in step S36 that the target modulation degree mwo is higher than or equal to the initial target modulation degree mini, in step S38, the write power Pw is set to the initial write power Pini, and the operation proceeds to step S42. If it is not determined in step S36 that the target modulation degree mwo is higher than or equal to the initial target modulation degree mini, in step S40, the write power Pw is set to a write power Pini·X, and the operation proceeds to step S42. The write power Pini·X is obtained by multiplying the initial write power Pini by a value X that is preset in CPU 24 and is smaller than one (ex. 0.95).

That is, in step S40, the write power Pw is reduced by a given amount from the initial write power Pini of a last recording, in which an optical disk recording apparatus other than the one shown in FIG. 5 may be employed, if it is determined in step S36 that the initial modulation degree mini of the last recording is higher than the target modulation degree mwo.

In step S42, the OPC operation ends. In step S42, an optimum erase power Peo is set based on the above-described equations (4) and (5) by using the coefficients ε and κ recorded on the optical disk 20 as the ATIP information. Thereafter, in step S44, an overwriting starts.

By thus setting a level of the write power Pw for an overwriting, the write power Pw is always set to the initial write power Pini corresponding to the initial modulation degree mini if the target modulation degree mwo is higher than or equal to the initial modulation degree mini. Since the write power Pw is set to a lower level than the optimum write power Pwo measured by the OPC operation, the durability of the optical disk 20 and the optical disk recording apparatus is improved. If the target modulation degree mwo is lower than the initial modulation degree mini, the write power Pw is reduced by the given amount from the initial write power Pini of the last recording. By repeating this operation, the write power Pw approaches the optimum write power Pwo measured by the OPC operation. That is, the write power Pw is gradually decreased to a level at which the durability of the optical disk 20 and the optical disk recording apparatus is secured with recording characteristics being maintained in good condition.

In the case of placing emphasis on securing recording accuracy, the write power Pw may be set to the optimum write power Pwo if the target modulation degree mwo is higher than or equal to the initial modulation degree mini. The contents of the OPC operation (the characteristic shown in FIG. 4) are stored in the RAM of the CPU 24 for a certain period of time as a history. Therefore, if data is overwritten continuously to different areas, values obtained in a preceding OPC operation can be used. That is, steps S16 through S32 are skipped after the initial modulation degree mini of an area on which an overwriting is performed is measured, and in step S34, the initial modulation degree mini is compared with the target modulation degree mwo obtained from the history of the OPC operation.

Figure 8:
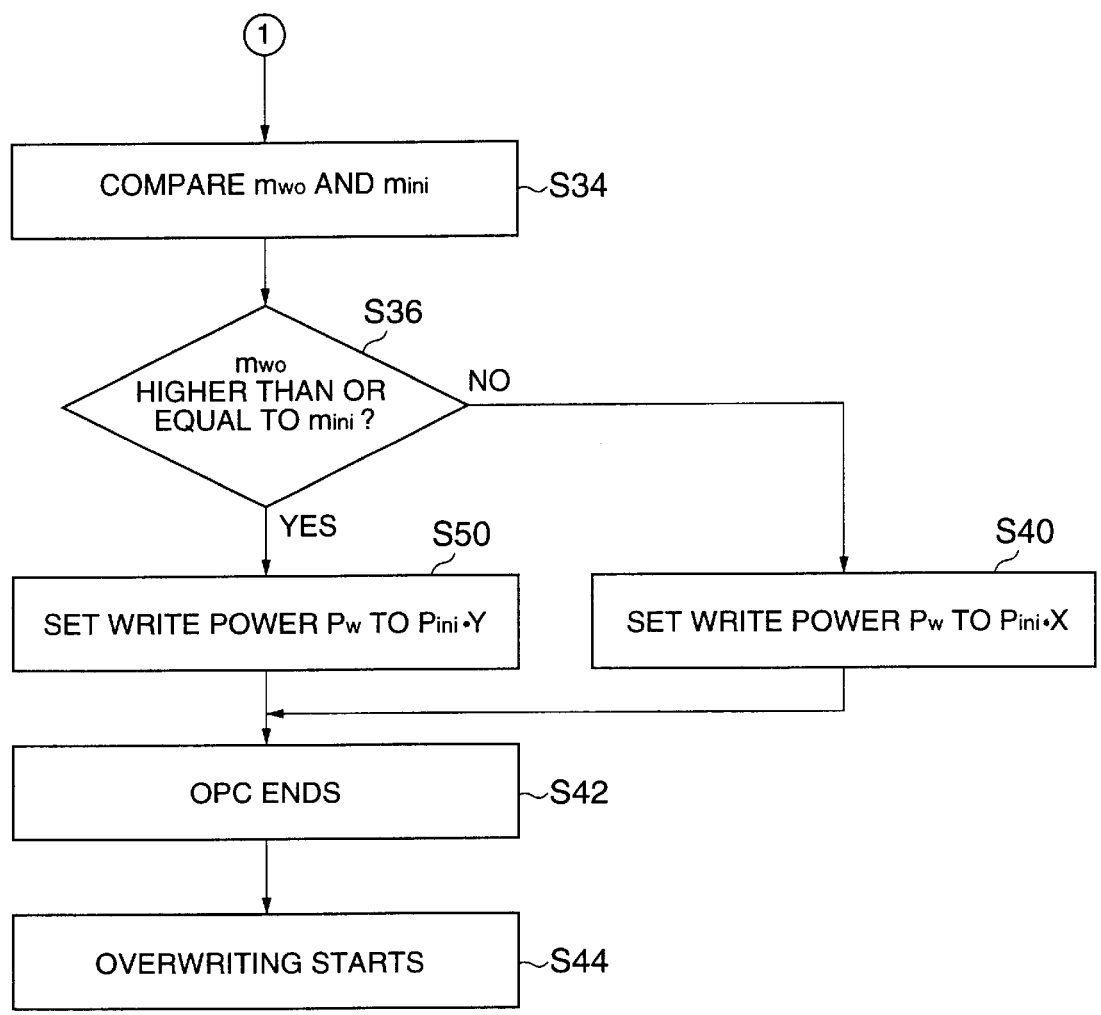
FIG. 8 is a variation of the flowchart of FIG. 7.

FIG. 8 is a variation of the flowchart of FIG. 7. In FIG. 8, step S50 replaces step S38 of FIG. 7. In step S50, the write power Pw is set to a write power Pini·Y. The write power Pini·Y is obtained by multiplying the initial write power Pini by a value Y that is preset in the CPU 24 and is larger than one (ex. 1.05).

By thus increasing the write power Pw by a given amount (Y) from the initial write power Pini corresponding to the initial modulation degree mini, higher recording accuracy can be expected, and at the same time, the durability of the optical disk 20 and the optical disk recording apparatus can be maintained.

By repeating step S50, the write power Pw approaches the optimum write power Pwo measured by the OPC operation. That is, the write power Pw is gradually increased to a level at which sufficient recording accuracy is obtained with the durability of the optical disk 20 and the optical disk recording apparatus being maintained.

Figure 9:
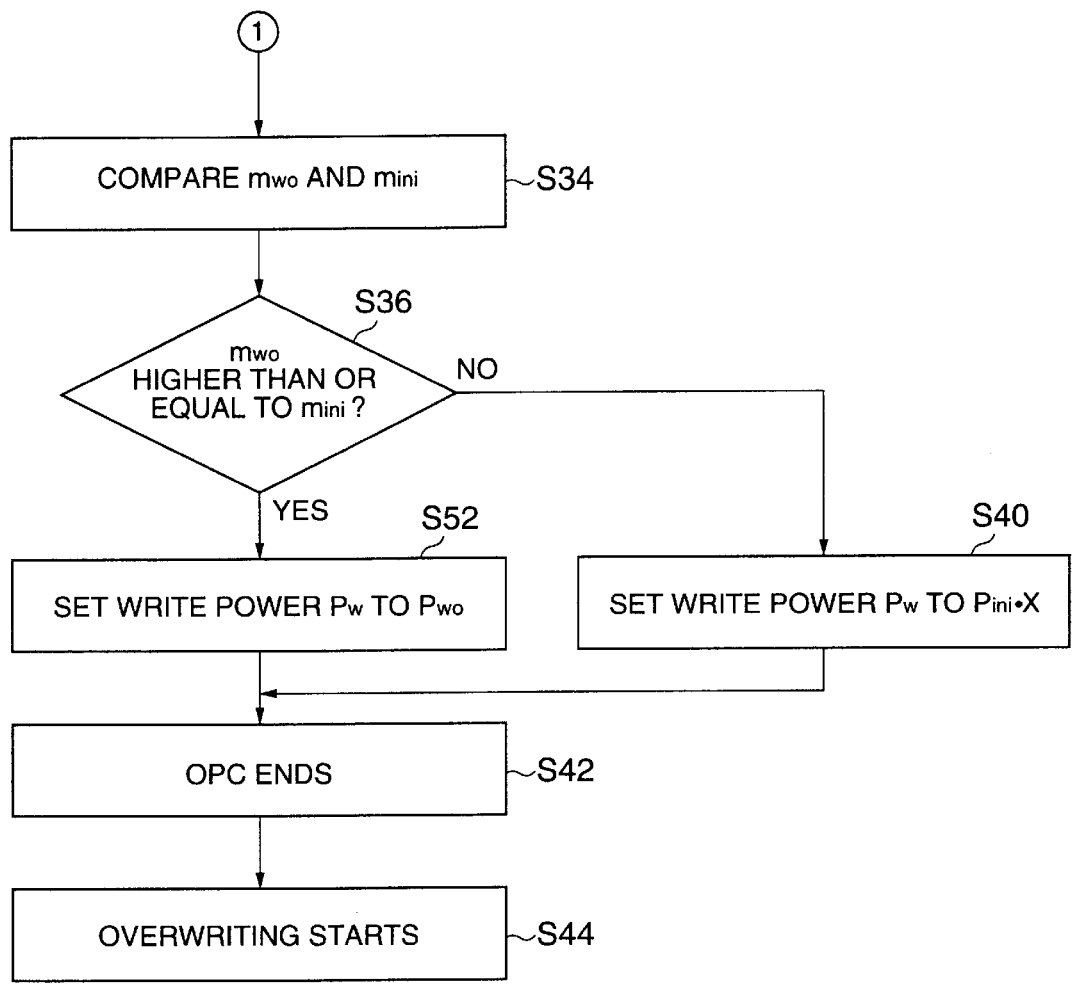
FIG. 9 is another variation of the flowchart of FIG. 7.

FIG. 9 is another variation of the flowchart of FIG. 7. In FIG. 9, step S52 replaces step S38 of FIG. 7. In step S52, the write power Pw is set to the optimum write power Pwo. As the above-described variation shown in FIG. 8, the variation shown in FIG. 9 is applied to a case in which emphasis is placed on the recording accuracy. Further, since the optimum write power Pwo is originally a write power that is determined to be best for the combination of the optical disk 20 and the optical disk recording apparatus at the time of the overwriting, the durability of the optical disk 20 and the optical disk recording apparatus can also be secured sufficiently.

Figure 10:
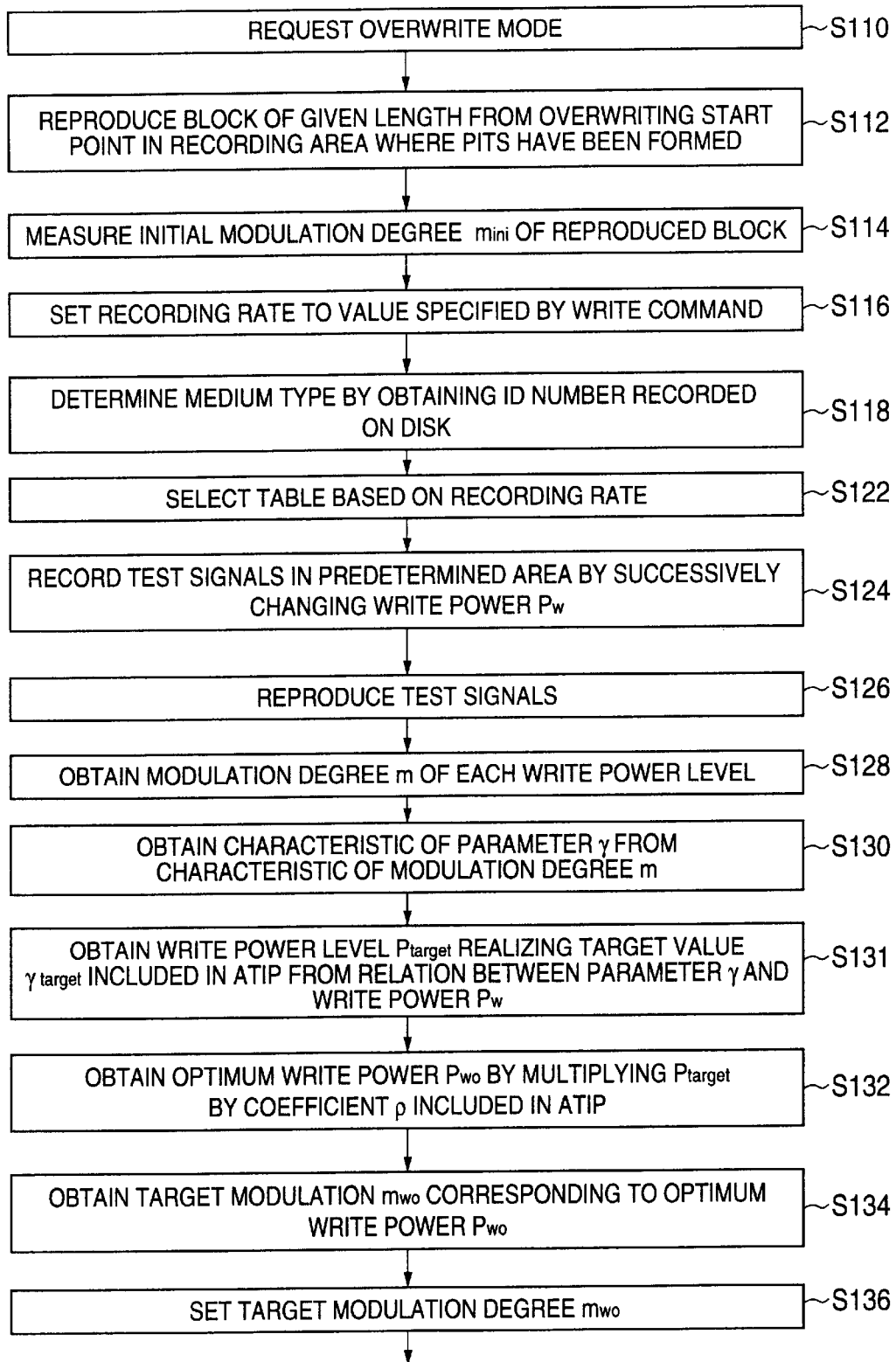
FIGS. 10 and 11 are flowcharts of a second embodiment of the OPC operation performed by the CPU at the time of the overwriting.
Figure 11:
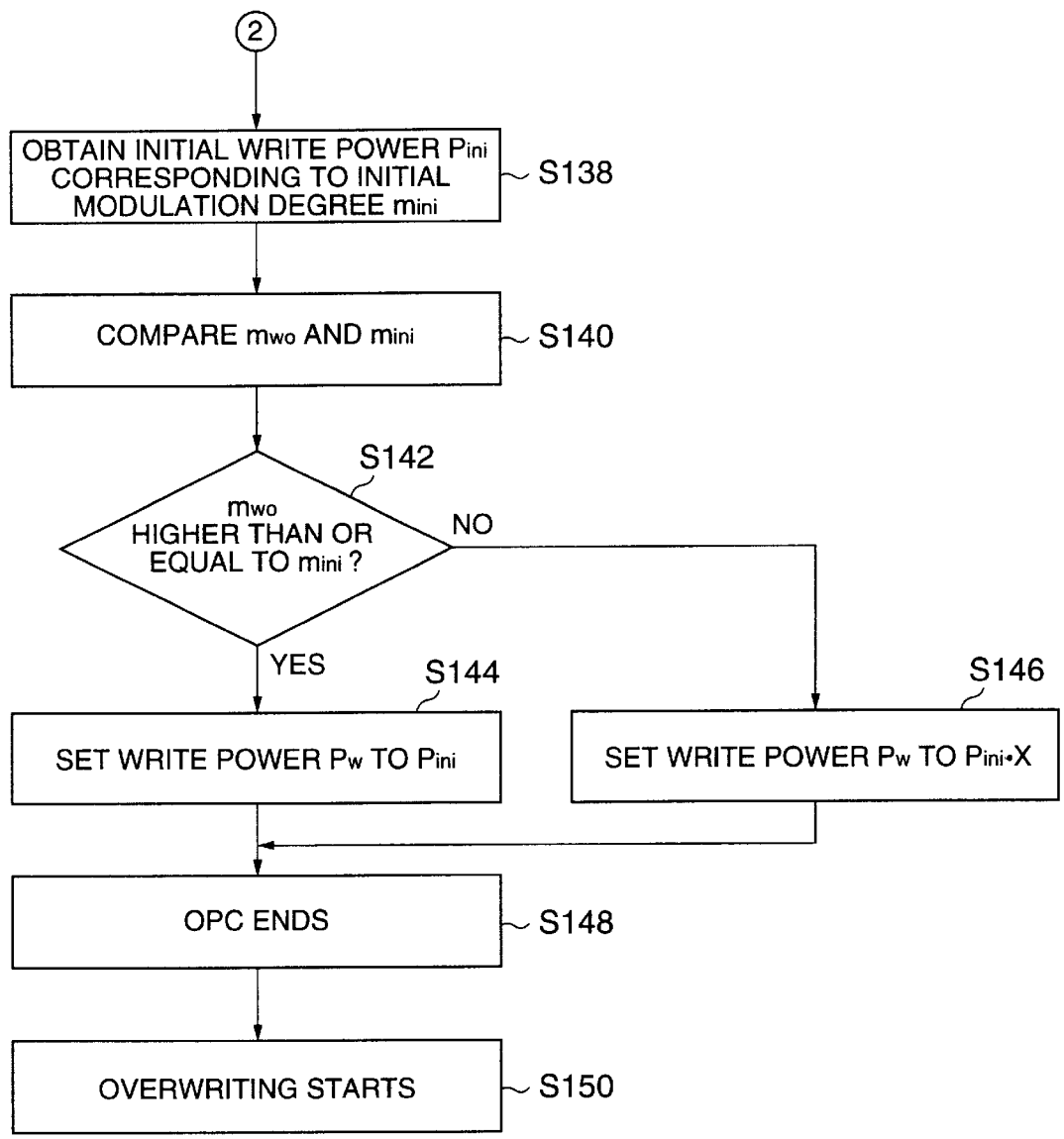

FIGS. 10 and 11 are flowcharts of a second embodiment of the OPC operation performed by the CPU 24 at the time of an overwriting. The second embodiment is an OPC operation of a case where a target modulation degree mwo corresponding to the ID number of a loaded optical disk is not stored in the ROM of the CPU 24.

In step S110 of FIG. 10, the operation mode instruction part 50 requests an overwrite mode, and in step S112, the CPU 24 reproduces a block of a given length from an overwriting start point in the recording area of the optical disk 20 in which area pits are already formed. Then, in step S114, the CPU 24 measures an initial modulation degree mini of the reproduced block.

Next, in step S116, the recording rate is set to a value specified by a write command, and in step S118, the optical disk type (medium type) is determined by obtaining the ID number recorded on the optical disk 20 as the ATIP information. Next, in step S122, a corresponding one of the tables stored in the ROM is selected based on the recording rate, and in step S124, the write power Pw is successively changed from the start power by the amount of the step power to have the 15 different levels so that test signals are recorded in the test recording area of the optical disk 20.

Next, in step S126, the test signals are reproduced, and in step S128, the modulation degree m is measured with respect to each of the 15 levels of the write power Pw so that the characteristic of the modulation degree m indicated by a solid line in FIG. 4 is obtained. Thereafter, in step S130, the parameter γ is obtained with respect to each of the 15 levels of the writing power Pw from the characteristic of the modulation degree m by using the equation (2). The parameter γ with respect to the modulation degree m is indicated by a dot-dash line in FIG. 4.

Next, in step S131, the writing power level Ptarget realizing the target value γ target included in the ATIP information of the optical disk 20 is obtained from the characteristic of the parameter γ indicated by the dot-dash line in FIG. 4. Then, in step S132, an optimum writing power Pwo is obtained by multiplying the writing power level Ptarget by the coefficient p included in the ATIP information. Then, in step S134, the optimum write power Pwo corresponding to the target modulation degree mwo is obtained from the characteristic of the modulation degree m shown in FIG. 4. Next, in step S136, the target modulation degree mwo obtained in step S134 is set.

Next, in step S138 of FIG. 11, an initial write power Pini corresponding to the initial modulation degree mini is obtained from the characteristic of the modulation degree m shown in FIG. 4. Then, in step S140, a comparison is made between the target modulation degree mwo and the initial target modulation degree mini, so that, in step S142, it is determined whether the target modulation degree mwo is higher than or equal to the initial target modulation degree mini. If it is determined in step S142 that the target modulation degree mwo is higher than or equal to the initial target modulation degree mini, in step S144, the write power Pw is set to the initial write power Pini, and the operation proceeds to step S42. If it is not determined in step S142 that the target modulation degree mwo is higher than or equal to the initial target modulation degree mini, in step S146, the write power Pw is set to a write power Pini·X, and the operation proceeds to step S42. The write power Pini·X is obtained by multiplying the initial write power Pini by a value X that is preset in CPU 24 and is smaller than one (ex. 0.95).

That is, in step S146, the write power Pw is reduced by a given amount from the initial write power Pini of a last recording, in which an optical disk recording apparatus other than the one shown in FIG. 5 may be employed, if it is determined in step S142 that the initial modulation degree mini of the last recording is higher than the target modulation degree mwo.

In step S148, the OPC operation ends. In step S148, an optimum erase power Peo is set based on the above-described equations (4) and (5) by using the coefficients ε and κ recorded on the optical disk 20 as the ATIP information. Thereafter, in step S150, an overwriting starts.

By thus setting a level of the write power Pw for an overwriting, the write power Pw is always set to the initial write power Pini corresponding to the initial modulation degree mini if the target modulation degree mwo is higher than or equal to the initial modulation degree mini. Since the write power Pw is set to a lower level than the optimum write power Pwo measured by the OPC operation, the durability of the optical disk 20 and the optical disk recording apparatus is improved. If the target modulation degree mwo is lower than the initial modulation degree mini, the write power Pw is reduced by the given amount from the initial write power Pini of the last recording. By repeating this operation, the write power Pw approaches the optimum write power Pwo measured by the OPC operation. That is, the write power Pw is gradually decreased to a level at which the durability of the optical disk 20 and the optical disk recording apparatus is secured with recording characteristics being maintained in good condition.

In the case of placing emphasis on securing recording accuracy, the write power Pw may be set to the optimum write power Pwo if the target modulation degree mwo is higher than or equal to the initial modulation degree mini. The contents of the OPC operation (the characteristic shown in FIG. 4) are stored in the RAM of the CPU 24 for a certain period of time as a history. Therefore, if data is overwritten continuously to different areas, values obtained in a preceding OPC operation can be used. That is, steps S116 through S138 are skipped after the initial modulation degree mini of an area on which an overwriting is performed is measured, and in step S140, the initial modulation degree mini is compared with the target modulation degree mwo obtained from the history of the OPC operation.

Figure 12:
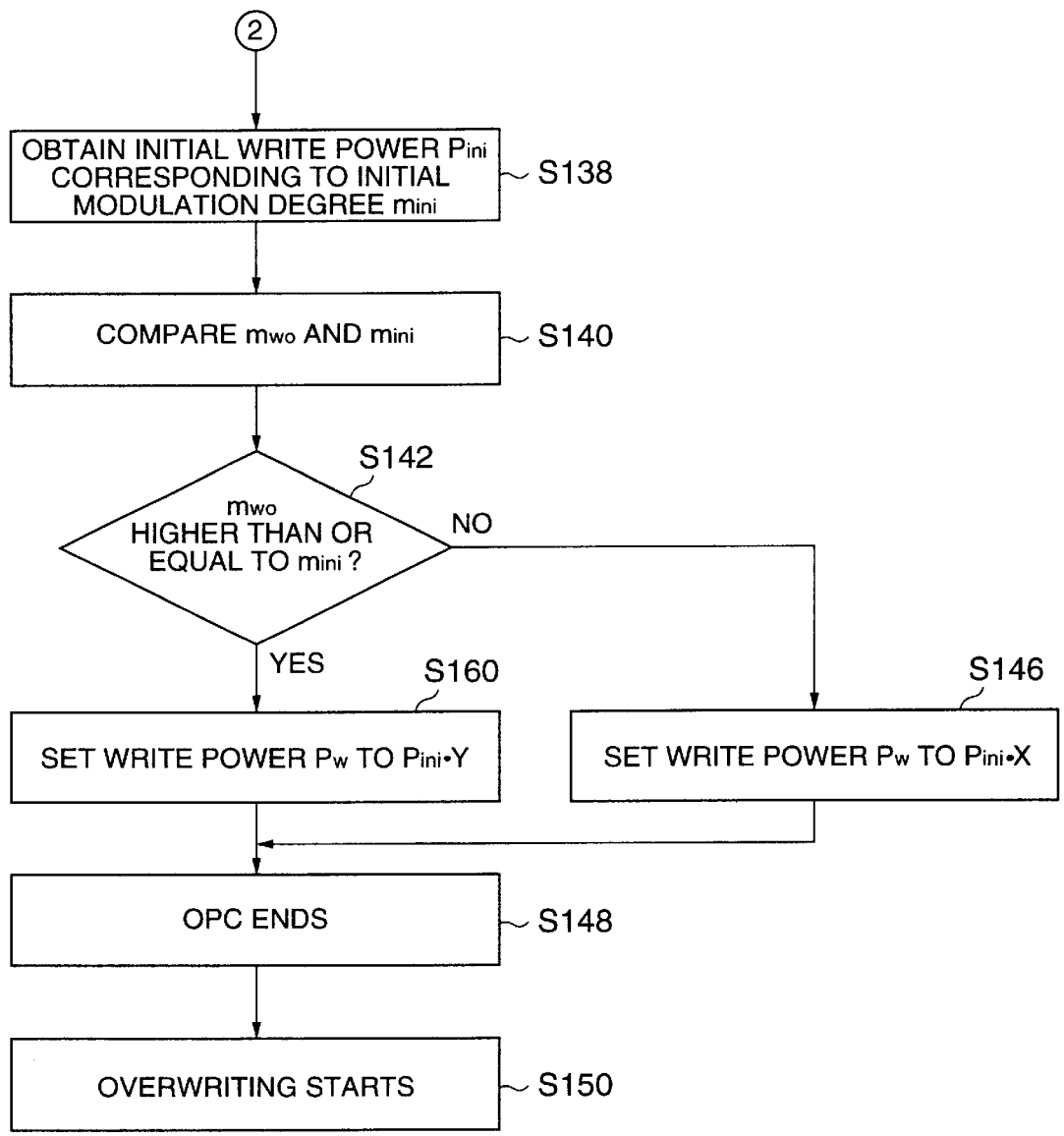
FIG. 12 is a variation of the flowchart of FIG. 11.

FIG. 12 is a variation of the flowchart of FIG. 11. In FIG. 12, step S160 replaces step S144 of FIG. 11. In step S160, the write power Pw is set to a write power Pini·Y. The write power Pini·Y is obtained by multiplying the initial write power Pini by a value Y that is preset in the CPU 24 and is larger than one (ex. 1.05).

By thus increasing the write power Pw by a given amount (Y) from the initial write power Pini corresponding to the initial modulation degree mini, higher recording accuracy can be expected, and at the same time, the durability of the optical disk 20 and the optical disk recording apparatus can be maintained.

By repeating step S160, the write power Pw approaches the optimum write power Pwo measured by the OPC operation. That is, the write power Pw is gradually increased to a level at which sufficient recording accuracy is obtained with the durability of the optical disk 20 and the optical disk recording apparatus being maintained.

Figure 13:
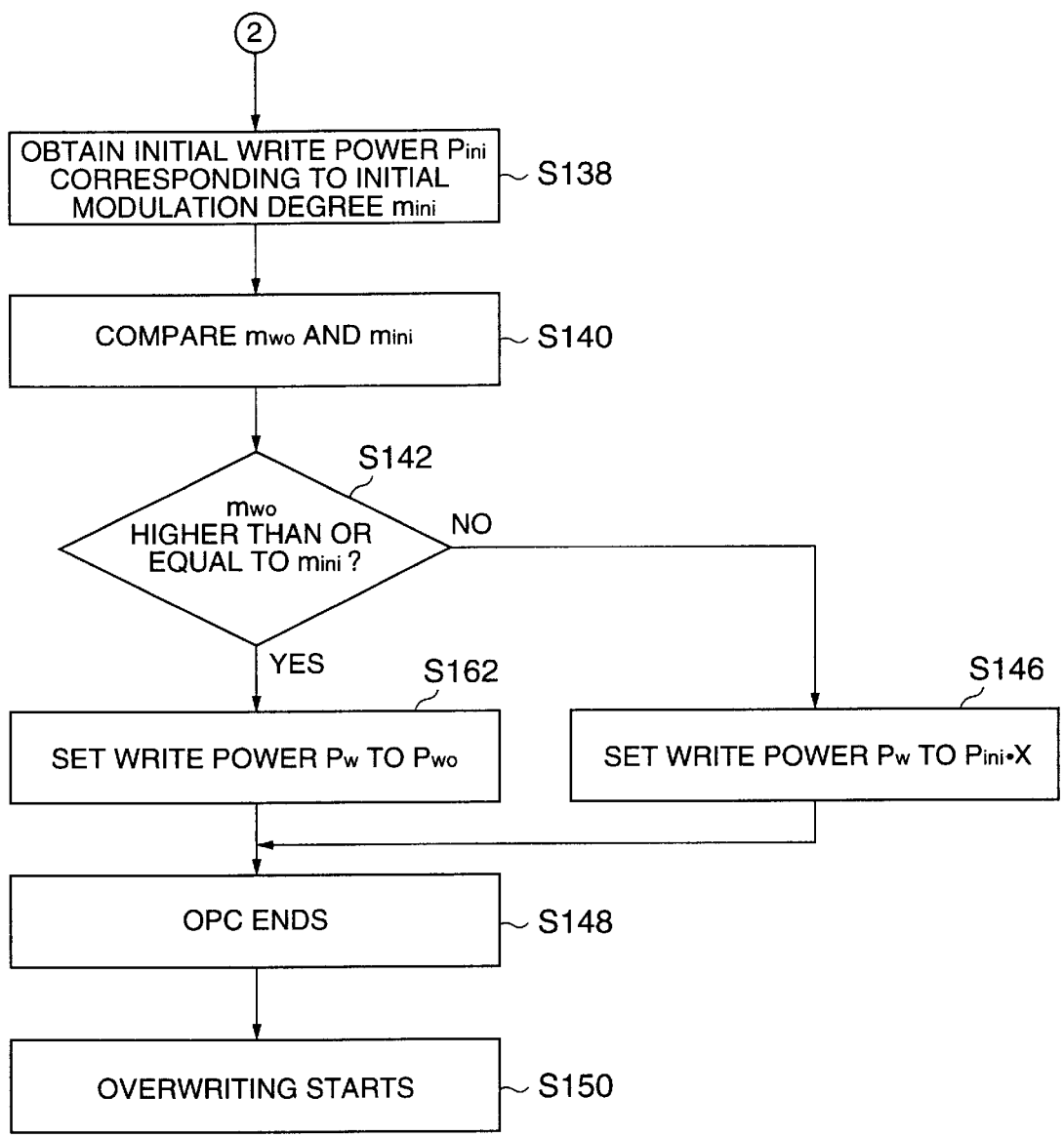
FIG. 13 is another variation of the flowchart of FIG. 11.

FIG. 13 is another variation of the flowchart of FIG. 11. In FIG. 13, step S162 replaces step S144 of FIG. 11. In step S162, the write power Pw is set to the optimum write power Pwo. As the above-described variation shown in FIG. 12, the variation shown in FIG. 11 is applied to a case in which emphasis is placed on the recording accuracy. Further, since the optimum write power Pwo is originally a write power that is determined to be best for the combination of the optical disk 20 and the optical disk recording apparatus at the time of the overwriting, the durability of the optical disk 20 and the optical disk recording apparatus can also be secured sufficiently.

Figure 14:
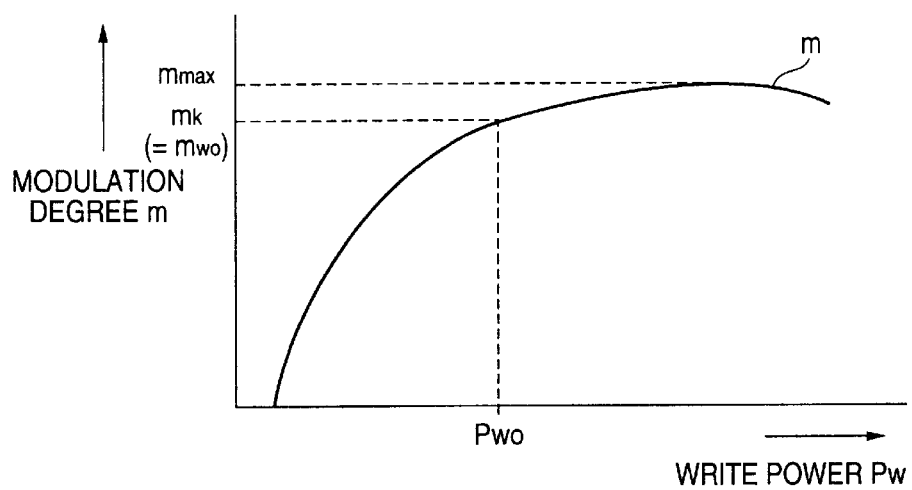
FIG. 14 is a diagram showing the relation between the write power and the modulation degree for illustrating another method of obtaining a target modulation degree.
Figure 15:
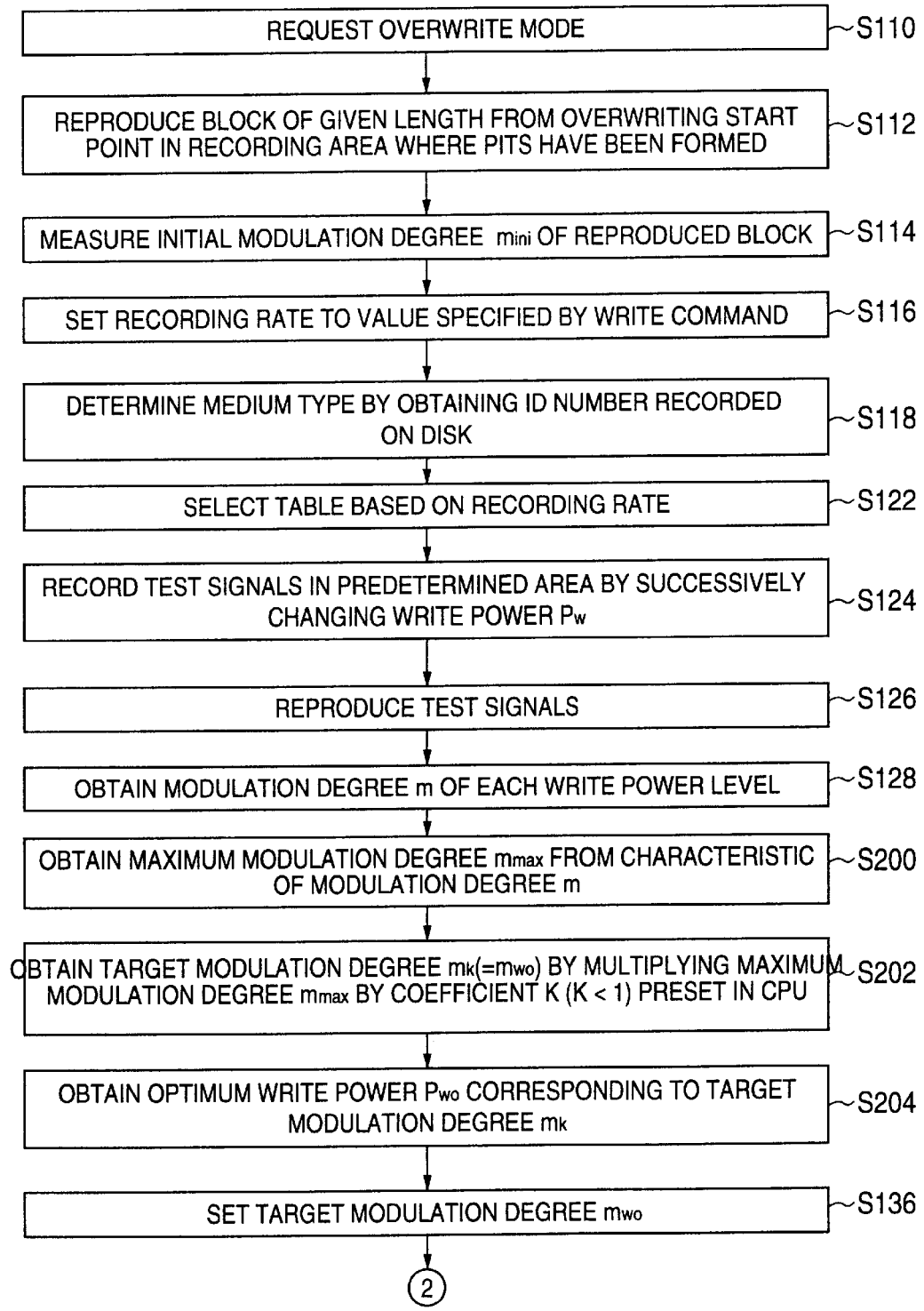
FIG. 15 is a variation of the flowchart of FIG. 10.

FIG. 14 is a diagram showing the relation between the write power Pw and the modulation degree m for illustrating another method of obtaining the target modulation degree mk (=mwo). FIG. 15 is a variation of the flowchart of FIG. 10.

In FIG. 15, steps S200 through S204 replace steps S130 through S134 of FIG. 10.

After the characteristic of the modulation degree m shown in FIG. 6 or 14 is obtained in step S128, the target modulation degree mk (=mwo) may be obtained by performing steps S200 through S204. First, in step S200, the maximum of the modulation degrees m (a maximum modulation degree mmax) is obtained from the characteristic of the modulation degree m shown in FIG. 14. Next, in step S202, the target modulation degree mk (=mwo) is obtained by multiplying the maximum modulation degree mmax by a coefficient K prestored in the ROM of the CPU 24. Here, the coefficient K is a real number smaller than one such as a value around 0.8. Then, in step S204, the optimum write power Pwo corresponding to the target modulation degree mk is obtained from the characteristic of the modulation degree m shown in FIG. 14.

As described above, the present invention is made in consideration of the fact that the overwriting recording characteristics depend greatly on the states, or depths, of pits already formed on the optical disk, that is, the modulation degree m. Conventionally, no attention has been paid to the above-mentioned fact, which, in some cases, deteriorates the overwriting recording characteristics depending on the states of the already-formed pits.

The above-described steps S12 and S14, S24 through S30, S18 and S20, and S34 through S40 correspond to a modulation degree measurement part (a first part), a write power determination part (a second part), a target modulation degree obtaining part (a third part), and an overwriting write power obtaining part (a fourth part) of a first optical disk recording apparatus according to the present invention, respectively, and to steps (a), (b), (c), and (d) of a first method of recording data on an erasable optical disk according to the present invention, respectively.

The above-described steps S112 and S114, S124 through S128 and S138, S130, S131 through S136, and S140 through S146 correspond to a modulation degree measurement part (a first part), a write power determination part (a second part), a modulation degree parameter obtaining part (a third part), a target modulation degree obtaining part (a fourth part), and an overwriting write power obtaining part (a fifth part) of a second optical disk recording apparatus according to the present invention, respectively, and to steps (a), (b), (c), (d), and (e) of a second method of recording data on an erasable optical disk according to the present invention, respectively.

The above-described steps S112 and S114, S124 through S128 and S138, S200 through S204 and S136, and S140 through S146 correspond to a modulation degree measurement part (a first part), a write power determination part (a second part), a target modulation degree obtaining part (a third part), and an overwriting write power obtaining part (a fourth part) of a third optical disk recording apparatus according to the present invention, respectively, and to steps (a), (b), (c), and (d) of a third method of recording data on an erasable optical disk according to the present invention, respectively.

The present invention is not limited to the specifically disclosed embodiment, but variations and modifications may be made without departing from the scope of the present invention.

The present application is based on Japanese priority applications No. 2000-107052 filed on Apr. 7, 2000, and No. 2001-91193 filed on Mar. 27, 2001, the entire contents of which are hereby incorporated by reference.

What is claimed is:

1. A recording apparatus for an erasable optical disk, comprising:
   a first part which measures a modulation degree of a signal reproduced from an area of the optical disk at a time of overwriting first data recorded in the area with second data;
   a second part which determines a first write power level corresponding to the modulation degree measured by said first part based on a relation between write power levels and modulation degrees of signals reproduced from a test recording area of the optical disk, the signals being recorded therein with the corresponding write power levels different from one another;
   a third part which obtains a target modulation degree corresponding to a type of and a recording rate for the optical disk from one of tables prestoring modulation degrees corresponding to optical disk types and recording rates; and
   a fourth part which obtains a write power level for overwriting from the first write power level based on a comparison between the target modulation degree and the modulation degree measured by said first part,
   wherein the recording apparatus overwrites the first data with the second data with the write power level for overwriting.

2. The recording apparatus as claimed in claim 1, wherein said fourth part determines the first write power level to be the write power level for overwriting if the target modulation degree is higher than or equal to the modulation degree measured by said first part, and determines a second write power level to be the write power level for overwriting if the target modulation degree is lower than said modulation degree, the second write power level being obtained by lowering the first power level.

3. The recording apparatus as claimed in claim 1, wherein said fourth part determines a second write power level to be the write power level for overwriting if the target modulation degree is higher than or equal to the modulation degree measured by said first part, and determines a third write power level to be the write power level for overwriting if the target modulation degree is lower than said modulation degree, the second and third write power levels being obtained by raising and lowering the first power level, respectively.

4. The recording apparatus as claimed in claim 3, wherein the second write power level is an optimum write power level corresponding to the target modulation degree, the optimum write power level being obtained from the relation between the write power levels and the modulation degrees.

5. A recording apparatus for an erasable optical disk, comprising:
   a first part which measures a modulation degree of a signal reproduced from an area of the optical disk at a time of overwriting first data recorded in the area with second data;
   a second part which determines a first write power level corresponding to the modulation degree measured by said first part based on a first relation between write power levels and modulation degrees of signals reproduced from a test recording area of the optical disk, the signals being recorded therein with the corresponding write power levels different from one another;
   a third part which obtains, based on the first relation, a second relation between the write power levels and modulation parameters obtained from the modulation degrees;

a fourth part which obtains, based on the first and second relations, a target modulation degree corresponding to a target modulation degree parameter read from the optical disk; and a fifth part which obtains a write power level for overwriting from the first write power level based on a comparison between the target modulation degree and the modulation degree measured by said first part, wherein the recording apparatus overwrites the first data with the second data with the write power level for overwriting.

6. The recording apparatus as claimed in claim 5, wherein said fifth part determines the first write power level to be the write power level for overwriting if the target modulation degree is higher than or equal to the modulation degree measured by said first part, and determines a second write power level to be the write power level for overwriting if the target modulation degree is lower than said modulation degree, the second write power level being obtained by lowering the first power level.

7. The recording apparatus as claimed in claim 5, wherein said fifth part determines a second write power level to be the write power level for overwriting if the target modulation degree is higher than or equal to the modulation degree measured by said first part, and determines a third write power level to be the write power level for overwriting if the target modulation degree is lower than said modulation degree, the second and third write power levels being obtained by raising and lowering the first power level, respectively.

8. The recording apparatus as claimed in claim 7, wherein the second write power level is an optimum write power level corresponding to the target modulation degree, the optimum write power level being obtained from the first relation.

9. A recording apparatus for an erasable optical disk, comprising:

a first part which measures a modulation degree of a signal reproduced from an area of the optical disk at a time of overwriting first data recorded in the area with second data;

a second part which determines a first write power level corresponding to the modulation degree measured by said first part based on a relation between write power levels and modulation degrees of signals reproduced from a test recording area of the optical disk, the signals being recorded therein with the corresponding write power levels different from one another;

a third part which obtains a target modulation degree from the relation between the write power levels and the modulation degrees; and a fourth part which obtains a write power level for overwriting from the first write power level based on a comparison between the target modulation degree and the modulation degree measured by said first part, wherein the recording apparatus overwrites the first data with the second data with the write power level for overwriting.

10. The recording apparatus as claimed in claim 9, wherein said fourth part determines the first write power level to be the write power level for overwriting if the target modulation degree is higher than or equal to the modulation degree measured by said first part, and determines a second write power level to be the write power level for overwriting if the target modulation degree is lower than said modulation degree, the second write power level being obtained by lowering the first power level.

11. The recording apparatus as claimed in claim 9, wherein said fourth part determines a second write power level to be the write power level for overwriting if the target modulation degree is higher than or equal to the modulation degree measured by said first part, and determines a third write power level to be the write power level for overwriting if the target modulation degree is lower than said modulation degree, the second and third write power levels being obtained by raising and lowering the first power level, respectively.

12. The recording apparatus as claimed in claim 11, wherein the second write power level is an optimum write power level corresponding to the target modulation degree, the optimum write power level being obtained from the relation between the write power levels and the modulation degrees.

13. A method of recording data on an erasable optical disk, comprising the steps of:

(a) measuring a modulation degree of a signal reproduced from an area of the optical disk at a time of overwriting first data recorded in the area with second data;

(b) determining a first write power level corresponding to the modulation degree measured by said step (a) based on a relation between write power levels and modulation degrees of signals reproduced from a test recording area of the optical disk, the signals being recorded therein with the corresponding write power levels different from one another;

(c) obtaining a target modulation degree corresponding to a type of and a recording rate for the optical disk from one of tables prestoring modulation degrees corresponding to optical disk types and recording rates;

(d) obtaining a write power level for overwriting from the first write power level based on a comparison between the target modulation degree and the modulation degree measured by said step (a); and (e) overwriting the first data with the second data with the write power level for overwriting.

14. The method as claimed in claim 13, wherein said step (d) determines the first write power level to be the write power level for overwriting if the target modulation degree is higher than or equal to the modulation degree measured by said step (a), and determines a second write power level to be the write power level for overwriting if the target modulation degree is lower than said modulation degree, the second write power level being obtained by lowering the first power level.

15. The method as claimed in claim 13, wherein said step (d) determines a second write power level to be the write power level for overwriting if the target modulation degree is higher than or equal to the modulation degree measured by said step (a), and determines a third write power level to be the write power level for overwriting if the target modulation degree is lower than said modulation degree, the second and third write power levels being obtained by raising and lowering the first power level, respectively.

16. The method as claimed in claim 15, wherein the second write power level is an optimum write power level corresponding to the target modulation degree, the optimum write power level being obtained from the relation between the write power levels and the modulation degrees.

17. A method of recording data on an erasable optical disk, comprising the steps of:

(a) measuring a modulation degree of a signal reproduced from an area of the optical disk at a time of overwriting first data recorded in the area with second data;

(b) determining a first write power level corresponding to the modulation degree measured by said step (a) based on a first relation between write power levels and modulation degrees of signals reproduced from a test recording area of the optical disk, the signals being recorded therein with the corresponding write power levels different from one another;

(c) obtaining, based on the first relation, a second relation between the write power levels and modulation parameters obtained from the modulation degrees;

(d) obtaining, based on the first and second relations, a target modulation degree corresponding to a target modulation degree parameter read from the optical disk;

(e) obtaining a write power level for overwriting from the first write power level based on a comparison between the target modulation degree and the modulation degree measured by said step (a); and (f) overwriting the first data with the second data with the write power level for overwriting.

18. The method as claimed in claim 17, wherein said step (e) determines the first write power level to be the write power level for overwriting if the target modulation degree is higher than or equal to the modulation degree measured by said step (a), and determines a second write power level to be the write power level for overwriting if the target modulation degree is lower than said modulation degree, the second write power level being obtained by lowering the first power level.

19. The method as claimed in claim 17, wherein said step (e) determines a second write power level to be the write power level for overwriting if the target modulation degree is higher than or equal to the modulation degree measured by said step (a), and determines a third write power level to be the write power level for overwriting if the target modulation degree is lower than said modulation degree, the second and third write power levels being obtained by raising and lowering the first power level, respectively.

20. The method as claimed in claim 19, wherein the second write power level is an optimum write power level corresponding to the target modulation degree, the optimum write power level being obtained from the first relation.

21. A method of recording data on an erasable optical disk, comprising the steps of:

(a) measuring a modulation degree of a signal reproduced from an area of the optical disk at a time of overwriting first data recorded in the area with second data;

(b) determining a first write power level corresponding to the modulation degree measured by said step (a) based on a relation between write power levels and modulation degrees of signals reproduced from a test recording area of the optical disk, the signals being recorded therein with the corresponding write power levels different from one another;

(c) obtaining a target modulation degree from the relation between the write power levels and the modulation degrees;

(d) obtaining a write power level for overwriting from the first write power level based on a comparison between the target modulation degree and the modulation degree measured by said step (a); and (e) overwriting the first data with the second data with the write power level for overwriting.

22. The method as claimed in claim 21, wherein said step (d) determines the first write power level to be the write power level for overwriting if the target modulation degree is higher than or equal to the modulation degree measured by said step (a), and determines a second write power level to be the write power level for overwriting if the target modulation degree is lower than said modulation degree, the second write power level being obtained by lowering the first power level.

23. The method as claimed in claim 21, wherein said step (d) determines a second write power level to be the write power level for overwriting if the target modulation degree is higher than or equal to the modulation degree measured by said step (a), and determines a third write power level to be the write power level for overwriting if the target modulation degree is lower than said modulation degree, the second and third write power levels being obtained by raising and lowering the first power level, respectively.

24. The method as claimed in claim 23, wherein the second write power level is an optimum write power level corresponding to the target modulation degree, the optimum write power level being obtained from the relation between the write power levels and the modulation degrees.

* * * * *